US012596297B2

(12) United States Patent
Ma et al.

(10) Patent No.: US 12,596,297 B2
(45) Date of Patent: Apr. 7, 2026

(54) TRANSPARENT PROJECTION SCREEN WITH FRESNEL STRUCTURE AND PROJECTION SYSTEM USING THE SAME

(71) Applicant: TD Electrooptic Films (TDEF) Inc., Suzhou (CN)

(72) Inventors: Jun Ma, Suzhou (CN); Jiuzhi Xue, Suzhou (CN)

(73) Assignee: TD ELECTROOPTIC FILMS (TDEF) INC., Suzhou (CN)

( * ) Notice: Subject to any disclaimer, the term of this patent is extended or adjusted under 35 U.S.C. 154(b) by 237 days.

(21) Appl. No.: 18/567,555

(22) PCT Filed: May 31, 2022

(86) PCT No.: PCT/CN2022/096270
§ 371 (c)(1),
(2) Date: Dec. 6, 2023

(87) PCT Pub. No.: WO2022/257819
PCT Pub. Date: Dec. 15, 2022

(65) Prior Publication Data
US 2024/0272539 A1 Aug. 15, 2024

(30) Foreign Application Priority Data
Jun. 7, 2021 (CN) .......................... 202110629866.9

(51) Int. Cl.
*G03B 21/60* (2014.01)
(52) U.S. Cl.
CPC .................................... *G03B 21/60* (2013.01)

(58) Field of Classification Search
CPC ........... G03B 21/60; G03B 21/62; G02B 3/08
See application file for complete search history.

(56) References Cited

U.S. PATENT DOCUMENTS

| | | | |
|---|---|---|---|
| 2012/0244910 A1 | 9/2012 | Hsu | |
| 2020/0271832 A1 | 8/2020 | Yamada et al. | |
| 2021/0072632 A1 | 3/2021 | Tao et al. | |

FOREIGN PATENT DOCUMENTS

| | | | |
|---|---|---|---|
| CN | 104298063 A | | 1/2015 |
| CN | 109725484 A | * | 5/2019 |
| CN | 208872998 U | | 5/2019 |

(Continued)

OTHER PUBLICATIONS

International Search Report (PCT/ISA/210) issued in PCT/CN2022/096270, dated Aug. 18, 2022.

*Primary Examiner* — Christopher E Mahoney
(74) *Attorney, Agent, or Firm* — Birch, Stewart, Kolasch & Birch, LLP

(57) ABSTRACT

The present invention relates to a transparent projection screen having a Fresnel structure. The projection screen is provided with Fresnel structure units having a specific structure, such that incident light irradiated to each Fresnel structure unit can be corrected by a Fresnel microstructure at this position and is reflected in the direction of an observer within a certain visible range, thereby improving the display uniformity of the transparent projection screen, and also reducing the interference of external ambient light on the transparent projection screen, such that a projection system using the transparent projection screen has a good viewing effect.

18 Claims, 5 Drawing Sheets

Side away from the common circle center

Side adjacent to the common circle center

Left view

Right view

(56)     References Cited

FOREIGN PATENT DOCUMENTS

| | | | | | |
|---|---|---|---|---|---|
| CN | 110824826 | A | 2/2020 | | |
| CN | 113204165 | A | 8/2021 | | |
| JP | 5-11345 | A | 1/1993 | | |
| JP | 6-123920 | A | 5/1994 | | |
| JP | 2005-134448 | A | 5/2005 | | |
| JP | 2010-139639 | A | 6/2010 | | |
| JP | 2013-152288 | A | 8/2013 | | |
| JP | 2017211455 | A | * | 11/2017 | |
| JP | 2018-132600 | A | 8/2018 | | |
| JP | 2020-38236 | A | 3/2020 | | |
| JP | 2020-134677 | A | 8/2020 | | |
| WO | WO-2014061730 | A1 | * | 4/2014 | .............. G02B 3/08 |
| WO | WO 2019/123896 | A1 | 6/2019 | | |

* cited by examiner

Side away from the common circle center

Side adjacent to the common circle center

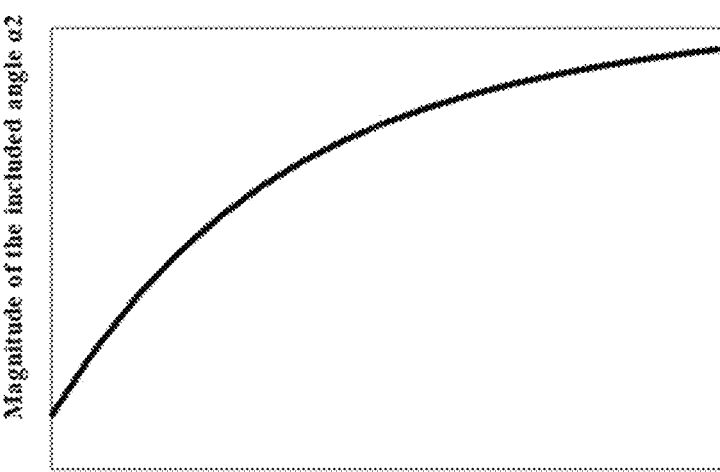
First side plane immediately adjacent to the common circle center
Second side plane away from the common circle center
FIG. 7
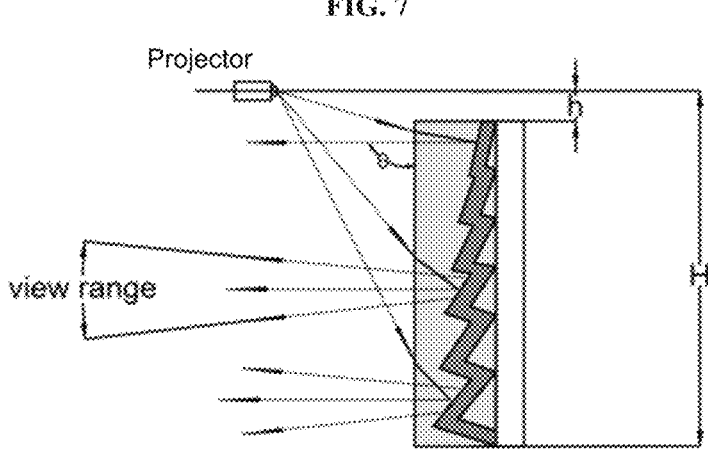
FIG. 8
FIG. 9

TRANSPARENT PROJECTION SCREEN WITH FRESNEL STRUCTURE AND PROJECTION SYSTEM USING THE SAME

CROSS-REFERENCE TO RELATED APPLICATION

This application claims priority to a patent application with application date Jun. 7, 2021, application number CN202110629866.9, and the title of the invention is "TRANSPARENT PROJECTION SCREEN WITH FRESNEL STRUCTURE AND PROJECTION SYSTEM USING THE SAME", the entire contents of which are incorporated herein by reference.

TECHNICAL FIELD

The present invention relates to the technical field of projection screens and projection systems, and specifically, the present invention relates to a transparent projection screen with a Fresnel structure capable of resisting interference from ambient light and capable of high-contrast clear imaging, and to a projection system using the same.

BACKGROUND

Projection displays are divided into two fields: home and commercial, such as laser projection displays for home use and for commercial use. At present, both home and commercial projection displays belong to what might be called opaque displays. That is, a projection screen is fixed in an area, a projector will project a picture on the projection screen, and an observer can watch the content on the screen while an image of an object behind the projection screen is blocked. Recently in some special application scenarios, such as car projection display, subway projection display, large-scale commercial advertisements, merchandise show windows, senior meeting rooms, etc., the observer requires the projection screen to not only serve as a display content carrier, but also have the effect of transparency. In this way, the landscape behind the projection screen can also be presented to the observer through the projection screen, that is, there is the need for a transparent display technology, and transparent display can meet the observer's demand for a sense of technology. However, the current home laser projection and commercial projection screen are unable to realize the effect of transparent display.

In order to achieve transparent display, a short throw projector is usually used to solve the light source reflection and save installation space. However, problems such as uneven brightness and small viewing angle caused by short throw projection seriously affect the viewing experience. At the same time, short throw transparent projection is more likely to be affected by ambient light and cannot realize high contrast clear imaging.

SUMMARY OF THE INVENTION

The objective of the present invention is to provide a transparent projection screen that minimizes the effect due to ambient light. Another objective of the present invention is to provide a projection screen that can show image clearly with high contrast and has uniform brightness and desirable viewing angle. A third objective of the present invention is to provide a transparent projection screen with a Fresnel structure and a projection system using the same.

In order to achieve the above objectives, the present application provides a transparent projection screen with a Fresnel structure, comprising:

a substrate layer having a first surface and a second surface opposite to each other in parallel;

a Fresnel structural layer composed of a plurality of Fresnel structural units formed on the first surface of the substrate layer, wherein the plurality of Fresnel structural units is arranged to form a plurality of concentric arcs having a common circle center, each of the Fresnel structural units comprises a first side surface close to the common circle center, a second side surface away from the common circle center, and a bottom surface parallel to the first surface of the substrate layer, a plurality of the first side surfaces and a plurality of the second side surfaces form a first surface of the Fresnel structural layer, a plurality of the bottom surfaces form a second surface of the Fresnel structural layer, a cross-section contour of each of the Fresnel structural units comprises a line a, a line b, and a line c that mutually intersect, a tangent line at any point on the line b makes an angle $\beta 1 > 60°$ with the line c, and the Fresnel structural layer has a first refractive index n1;

a display layer having a first surface and a second surface opposite to each other, wherein the second surface of the display layer is disposed on and substantially conformal to the first surface of the Fresnel structural layer, such that the display layer forms a structure substantially identical to the first surface of the Fresnel structural layer, and the display layer has a second refractive index n2; and a refractive index matching layer having a first surface and a second surface opposite to each other, wherein the second surface of the refractive index matching layer is disposed on and conformal to the first surface of the display layer, the first surface of the refractive index matching layer is a surface parallel to the second surface of the substrate layer, and the refractive index matching layer has a third refractive index n3;

wherein the first refractive index n1 is substantially the same as the third refractive index n3.

As a further improvement of this application, wherein a tangent line at any point on the line a makes an angle $\alpha 1$, $0° < \alpha 1 \leq 60°$, to the line c.

As a further improvement of this application, wherein a vertical distance from a point of intersection P of the line a with the line b to the line c is h1, and h1 on each of the Fresnel structure units increases gradually as it is further away from the common circle center.

As a further improvement of this application, wherein each of the Fresnel structure units has a triangular cross-section, an angle between the line a and the line c is $\alpha 2$, $0° < \alpha 2 \leq 60°$, and an angle between the line b and the line c is $\beta 2$, $\beta 2 > 60°$.

As a further improvement of this application, wherein the angle $\alpha 2$ on different Fresnel structure units increases gradually as it is further away from the common circle center.

As a further improvement of this application, comprising a first side plane immediately close to the common circle center and a second side plane away from the common circle center and opposite to the first side plane, wherein the Fresnel structure unit moves in a straight line in a direction perpendicular to a plane where the first side plane is located from the first side plane to the second side plane, and the angle $\alpha 2$ of the Fresnel structural unit shows an overall monotonically increasing trend.

As a further improvement of this application, wherein the line c on each of the Fresnel structure units has a substantially fixed length.

As a further improvement of this application, wherein the vertical distance from the point of intersection P of the line a with the line b to the line c on each of the Fresnel structure units is h1, and h has a substantially fixed height.

As a further improvement of this application, wherein the first refractive index n1 ranges from 1.4 to 1.6.

As a further improvement of this application, wherein a first transparent optical material for preparing the Fresnel structure layer is an optical grade high transmittance optical adhesive, the optical grade high transmittance optical adhesive being at least one of an acrylic type resin, an unsaturated polyester, a poly urethane, an epoxy resin, and a light curing adhesive.

As a further improvement of this application, wherein the display layer has a thickness d≤500 μm.

As a further improvement of this application, wherein the second refractive index n2 is ≥1.6.

As a further improvement of this application, wherein a molding process of the display layer is any one of evaporation, sputtering, coating, and sandblasting.

As a further improvement of this application, wherein a second transparent optical material for preparing the display layer is metal or metal oxide.

As a further improvement of this application, wherein a material for preparing the substrate layer is a rigid transparent material or a flexible transparent material.

As a further improvement of this application, wherein the rigid transparent material is glass.

As a further improvement of this application, wherein the flexible transparent material is any one of PET, PC, PMMA, PE.

As a further improvement of this application, wherein the first side surface of each of the Fresnel structure units is provided with a convex or concave surface microstructure.

As a further improvement of this application, further comprising a protective layer disposed on the first surface of the refractive index matching layer.

As a further improvement of this application, wherein a material for preparing the protective layer is any one of glass, acrylic, PET or other high transmittance rigid or flexible material.

To achieve the above object, the present application also provides a projection system, comprising a projector and a transparent projection screen, the transparent projection screen is the above-mentioned transparent projection screen with a Fresnel structure.

As a further improvement of this application, wherein the projector is a short throw projector or an ultra-short throw projector.

As a further improvement of this application, wherein the projector is disposed perpendicular to a plane where the transparent projection screen is located and in the same straight line as the common circle center.

The beneficial effect of the present application lies in that, by providing a transparent projection screen with a Fresnel structure, the projection screen is provided with Fresnel structural units having a specific structure, which enables the incident light irradiated onto each of the Fresnel structural units to be corrected by a Fresnel microstructure at that position, and be reflected back to a direction of an observer in a certain visible range, which enhances the display uniformity of the transparent projection screen, and at the same time reduces the interference of the external ambient light on the transparent projection screen, such that the projection system using the same has good viewing effects.

BRIEF DESCRIPTION OF THE DRAWINGS

FIG. 7 shows an angular change trend of an angle α2 in the Fresnel structural unit according to embodiment 1;

FIG. 8 shows a schematic diagram of projected light of a transparent projection screen with a Fresnel structure according to embodiment 2;

FIG. 9 shows a schematic diagram of projected light of a transparent projection screen with a Fresnel structure of embodiment 3;

Figure 1:
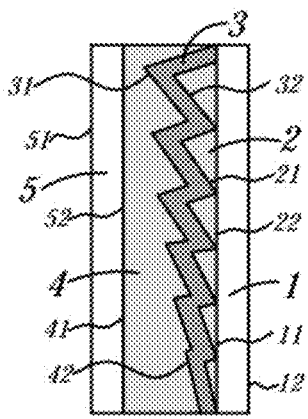
FIG. 1 shows a schematic diagram of a cross-sectional structure of a transparent projection screen with a Fresnel structure according to embodiment 1.

In the drawings: 1, substrate layer; 2, Fresnel structure layer; 3, display layer; 4, refractive index matching layer; 5, protective layer; 11, first surface of the substrate layer; 12, second surface of the substrate layer; 21, first surface of the Fresnel structure layer; 22, second surface of the Fresnel structure layer; 23, first side surface; 24, second side surface; 25, bottom surface; 26, concave surface microstructure; 27, convex surface microstructure; 31, first surface of the display layer; 32, second surface of the display layer; 41, first surface of the refractive index matching layer; 42, second surface of the refractive index matching layer; 6, first side plane; and 7, second side plane.

DETAILED DESCRIPTION

In order to make the objectives, technical solutions and advantages of the present application clearer, the technical solutions of the present application will be described clearly and completely in the following in connection with specific embodiments of the present application and the accompanying drawings. Obviously, the described embodiments are only a part of the embodiments of the present application, not all of the embodiments, and are not intended to limit the scope of the present invention. Based on the embodiments according to the present invention, all other embodiments obtained by the person of ordinary skill in the art without making creative labor are within the scope of protection of the present application.

In order to prepare a transparent projection screen capable of resisting interference from ambient light and capable of high contrast clear imaging, the present application provides a transparent projection screen with a Fresnel structure.

Embodiment 1

Figure 2:
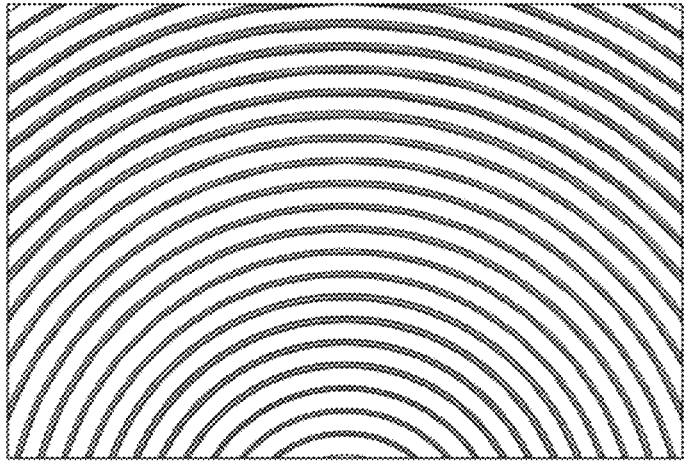
FIG. 2 shows a main view of the transparent projection screen with a Fresnel structure according to embodiment 1.
Figure 3:
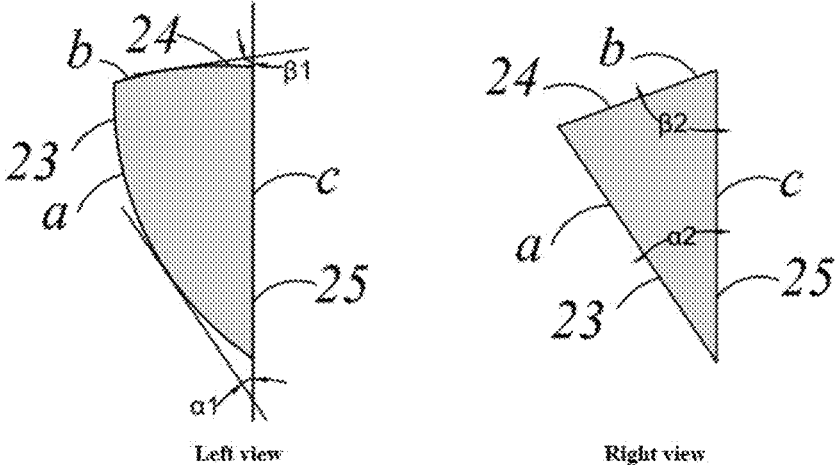
FIG. 3 shows a schematic diagram of a cross-sectional structure of a Fresnel structural unit according to embodiment 1.
Figure 4:
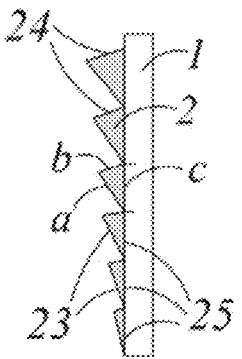
FIG. 4 shows a schematic diagram of a sectional structure of a substrate layer and a Fresnel structure layer of the transparent projection screen with a Fresnel structure according to embodiment 1.

A transparent projection screen with a Fresnel structure shown in FIG. 1 comprises:

a substrate layer 1 having a first surface 11 and a second surface 12 opposite to each other in parallel;

a Fresnel structural layer 2 composed of a plurality of Fresnel structural units formed on the first surface 11 of the substrate layer, in which the plurality of Fresnel structural units is arranged to form a plurality of concentric arcs having a common circle center, as shown in FIG. 2; as can be seen in FIG. 3, each of the Fresnel structural units comprises a first side surface 23 close to the common circle center, a second side surface 24 away from the common circle center, and a bottom surface 25 parallel to the first surface 11 of the substrate layer, as can be seen in FIG. 4, a plurality of first side surfaces 23 and a plurality of second side surfaces 24 form a first surface 21 of the Fresnel structural layer, and a plurality of bottom surfaces 25 form a second surface 22 of the Fresnel structural layer, as can be also seen in FIG. 3, a cross-section of each of the Fresnel structural units comprises a line a, α line b, and a line c that mutually intersect; and as shown in the left panel of FIG. 3, the left panel of FIG. 3 shows a schematic diagram of a cross-section of the Fresnel structural unit when the lines α and b are irregular lines, respectively, a tangent line at any point on the line b makes an angle of 1 with the line c, $\beta 1 > 60°$, the irregular lines are not only limited to arcs, but preferably the line b is a straight line, and the Fresnel structural layer 2 has a first refractive index n1;

a display layer 3 having a first surface 31 and a second surface 32 opposite to each other, in which the second surface 32 is disposed on and substantially conformal to the first surface 21 of the Fresnel structural layer, such that the display layer 3 forms a structure substantially identical to the first surface 21 of the Fresnel structural layer, and the display layer 3 has a second refractive index n2; and a refractive index matching layer 4 having a first surface 41 and a second surface 42 opposite to each other, in which the second surface 42 is disposed on and conformal to the first surface 31 of the display layer, the first surface 41 is a surface parallel to the second surface 12 of the substrate layer, and the refractive index matching layer 4 has a third refractive index n3.

The first refractive index n1 is substantially the same as the third refractive index n3.

Preferably, an angle between reflected light and a plane where the transparent projection screen is located is θ, the reflected light is formed by the reflection of incident light from the transparent projection screen, as shown in FIGS. 6, 8, 9 and 12, $30° \le \theta \le 90°$.

By providing a Fresnel structure unit with a specific structure, the transparent projection screen with a Fresnel structure mentioned above is capable of causing incident light irradiated onto each of the Fresnel structure units to be corrected by a Fresnel microstructure at that position, and the magnitude of the θ angle after correction is favorable for reflecting light into the visible range of an observer, which ultimately enhances the brightness uniformity of the transparent display screen. In addition, since a projector is usually disposed on one side of the projection screen for projection, when reflecting light, the projection screen away from a plane where the projector is located is usually affected by external ambient light. Therefore, setting the angle $\beta 1 > 60°$ is favorable for reflecting and transmitting the external ambient light into a direction that is not visible to the observer, thereby reducing the influence of the ambient light on the screen display picture. Therefore, the design of the Fresnel microstructure and microstructure angle of the transparent display screen is conducive to enhancing the overall display effect of the display screen.

Figure 5:
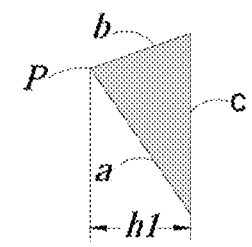
FIG. 5 shows a schematic diagram of a cross-sectional structure of the Fresnel structural unit according to embodiment 1.

According to the present invention, as a preferred embodiment, as shown in the left panel of FIG. 3, the left panel of FIG. 3 shows a schematic diagram of the cross-section of the Fresnel structural unit when the lines a and b are irregular lines, respectively. And a angle between a tangent line at any point on the line a and the line c is α1, $0° < \alpha 1 \le 60°$. Within this angle range, most of light incident onto the first side surface 23 of any one of the Fresnel structural units will enter the range of view of the observer in the form of reflected light. Furthermore, the line a is a straight line. Even further, as shown in FIG. 5, a vertical distance from a point of intersection P of the line a and the line b to the line c is h1, and the h1 on each of the Fresnel structural units gradually increases as it is further away from the common circle center. This structural design, when the projector is perpendicular to the plane where the transparent projection screen is located and in the same straight line as the common circle center, ensures that the light projected by the projector is sufficiently irradiated onto the first side surface 23 of each of the Fresnel structural unit for reflection.

According to the present invention, as a preferred embodiment, each of the Fresnel structural units has a preferably triangular cross-section. As shown in the right panel of FIG. 3, the right panel of FIG. 3 shows a schematic diagram of the cross-section of the Fresnel structural unit when the line a and the line b are straight lines, respectively. An angle between the line a and the line c is α2, $0° < \alpha 2 \le 60°$, and an angle between the line b and the line c is β2, $\beta 2 > 60°$. This structural design facilitates the reflection and transmission of external ambient light to a direction not visible to the observer, thereby reducing the influence of ambient light on the screen display image. When light is incident onto the first side surface 23 of any one of the Fresnel structural units, most of it enters the view range of the observer as reflected light. In addition, the line a and the line c are set in the form of straight lines to facilitate the processing design of the transparent projection screen and reduce the production cost.

Further, the angle α2 on different Fresnel structural units gradually increases as it is further away from the common circle center. This structural design likewise can ensure that the light projected by the projector is sufficiently irradiated onto the transparent projection screen, when the projector is disposed perpendicular to the plane where the transparent projection screen is located and in the same straight line as the common circle center. Further, as shown in the right panel of FIG. 3 and FIG. 6, the transparent projection screen comprises a first side plane 6 immediately close to the common circle center and a second side plane 7 opposite to the first side plane 6 and away from the common circle center. In a direction perpendicular to the plane in which the first side plane 6 is located, and in a direction from the location of the first side plane 6 to the location of the second side plane 7, the angle α2 of a number of Fresnel structural units shows an overall monotonically increasing trend, such as a linear or non-linear increasing trend. A vertical distance between a projection device and a plane where the display layer 3 is located is L. A vertical distance between a plane where the projection device is located parallel to a plane where the first side plane 6 is located and the plane where the first side plane 6 is located is h. A vertical distance between the plane where the projection device is located parallel to the plane where the first side plane 6 is located and a plane where the second side plane 7 is located is H. When the Fresnel structural unit in the projection screen changes from h to H from the plane where the projection device is located parallel to the plane where the first side plane 6 is located in a direction perpendicular to the plane, the trend of the increase of the angle α2 is as shown in FIG. 7. It has been verified that the above structure is designed as the best embodiment which can ensure that the light projected by the projector is sufficiently irradiated onto the transparent projection screen, and the display uniformity of the transparent projection screen is high.

Another preferred embodiment is provided according to the present invention. As shown in FIG. 3, each of the Fresnel structural units has a preferably triangular cross-section, in which an angle between the line α and the line c is α2, 0°<α2≤60°, and an angle between the line b and the line c is β2, β2>60°. Further, the angle α2 on different Fresnel structural units gradually increases as it is further away from the common circle center. Further, the length of the line c on each of the Fresnel structural units may be substantially fixed and the angle α2 on different Fresnel structural units gradually increases as it is further away from the common circle center, so as to ensure that light projected onto the projection screen away from the common circle center can be projected at a visible angle to the observer's eye.

Another preferred embodiment is provided according to the present invention. As shown in FIGS. 3 and 5, each of the Fresnel structural units has a preferably triangular cross-section, in which an angle between the line α and the line c is α2, 0°<α2≤60°, and an angle between the line b and the line c is β2, β2>60°. Preferably, a vertical distance from a point of intersection P of the line α with the line b to the line c on each of the Fresnel structural units is h1, and the height of h1 may be substantially fixed while the angle α2 on different Fresnel structural units gradually increase as it is further away from the common circle center, in order to ensure that light projected onto the projection screen away from the common circle center is projected at a visible angle into the observer's eye.

According to the present invention, as a preferred embodiment, the first refractive index n1 ranges from 1.4 to 1.6. A first transparent optical material for preparing the Fresnel structure layer 2 is an optical grade high transmittance optical adhesive. The optical grade high transmittance optical adhesive may be, but is not limited to, at least one of an acrylic-type resin, an unsaturated polyester, a polyurethane, an epoxy resin, and a light-curing adhesive.

According to the present invention, as a preferred embodiment, the display layer 3 has a thickness d≤500 µm. The second refractive index n2 is ≥1.6. A molding process of the display layer 3 may be, but is not limited to, any one of evaporation, sputtering, coating, sandblasting, sputtering, and the like. A second transparent optical material for preparing the display layer 3 may be, but is not limited to, metal or metal oxide.

According to the present invention, as a preferred embodiment, a material for preparing the substrate layer 1 is a rigid transparent material or a flexible transparent material. Preferably, the rigid transparent material is glass. The flexible transparent material may be, but is not limited to, any one of PET, PC, PMMA, PE and the like.

According to the present invention, as a preferred embodiment, the transparent projection screen further comprises a protective layer 5 disposed on the first surface of the refractive index matching layer 4. The protective layer 5 may have anti-scratch and anti-abrasion properties, serving to protect the surface of the transparent projection screen. Preferably, a material for preparing the protective layer 5 may be, but is not limited to, any one of glass, acrylic, PET or other high transmittance hard or flexible materials and the like.

Figure 6:
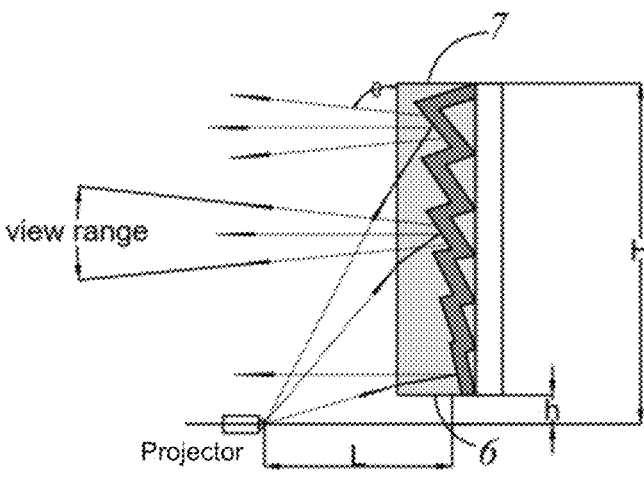
FIG. 6 shows a schematic diagram of projected light of the transparent projection screen with a Fresnel structure according to embodiment 1.

In addition, a schematic diagram of projection light of the transparent projection screen with a Fresnel structure is shown according to the present invention. As shown in FIG. 6, it shows a schematic diagram of projection light of the transparent projection screen with a Fresnel structure mainly for a scenario where the projection screen has a small size and is located directly in front of the human eye. In this case, the Fresnel structure in the projection screen is designed such that reflected light passing through the projection screen enter the observer's eye in a direction substantially perpendicular to the projection screen.

Embodiment 2

The present application also shows a schematic diagram of projection light of another transparent projection screen with a different Fresnel structure. As shown in FIG. 8, this embodiment is a variation of embodiment 1. That is, the common circle center of the Fresnel structure in the transparent projection screen is located above. In this case, a projection device may be placed in an upper part of the transparent projection screen. From this alone, it can be seen that 1) the transparent projection screen with a Fresnel structure can be rotated at an arbitrary angle, and the common circle center of the Fresnel structure can be located at an arbitrary position close to the edge of the projection screen; and 2) the Fresnel structure in the transparent projection screen can also be rotated at an arbitrary angle, and the common circle center of the Fresnel structure can be located at an arbitrary position close to the edge of the projection screen. Preferably, the light source or projection device is disposed perpendicular to the projection screen and on the straight line where the common circle center is located or substantially perpendicular to the projection screen and substantially on the straight line where the common circle center is located. This structural design is conducive to the transparent projection screen reflecting light emitted by the light source or projection device sufficiently to improve the display uniformity and contrast brightness of the screen.

Embodiment 3

The present application also shows a schematic diagram of projected light of another transparent projection screen with a different Fresnel structure. As shown in FIG. 9, this embodiment is a variation of embodiment 1. The design of the Fresnel structure in the transparent projection screen in FIG. 7 is mainly for a scenario where the size of the projection screen is large and the projection screen as a whole is disposed above a horizontal plane where the human eye is located: light reflected from the first side surface 23 of any one of the Fresnel structural units disposed in an upper part of the projection screen is basically deflected downwardly at a certain angle in a direction perpendicular to the projection screen to enter the observer's eye; and light reflected from the first side surface 23 of any one of the Fresnel structural units disposed in a middle and lower part of the projection screen enters the observer's eye basically in a direction parallel to the projection screen. The above can be achieved by adjusting the vertical distance from the point of intersection P to the line c to h1 and/or the angle α1. For example, h1 on each of the Fresnel structural units gradually increases as it is further away from the common circle center and/or the angle α1 on each of the Fresnel structural units gradually increases as it is further away from the common circle center, etc.

Embodiment 4

Figure 10:
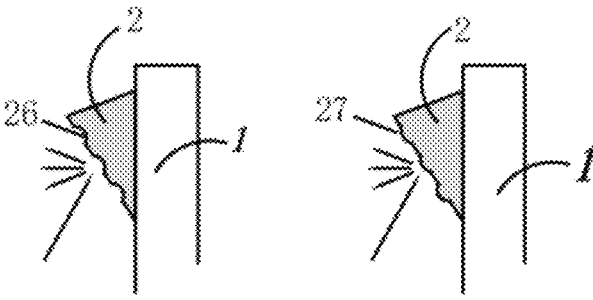
FIG. 10 shows a schematic diagram of a cross-sectional structure of a Fresnel structure unit having a surface microstructure according to embodiment 4.
Figure 11:
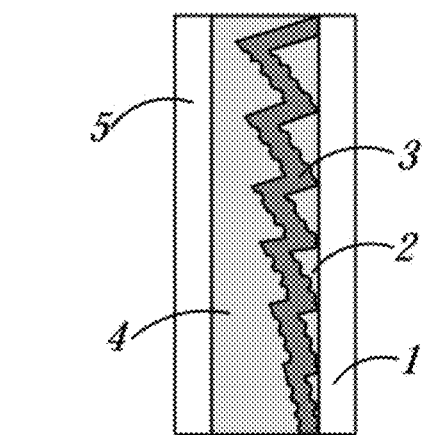
FIG. 11 shows a schematic diagram of a cross-sectional structure of a transparent projection screen with a Fresnel structure having a concave surface microstructure.
Figure 12:
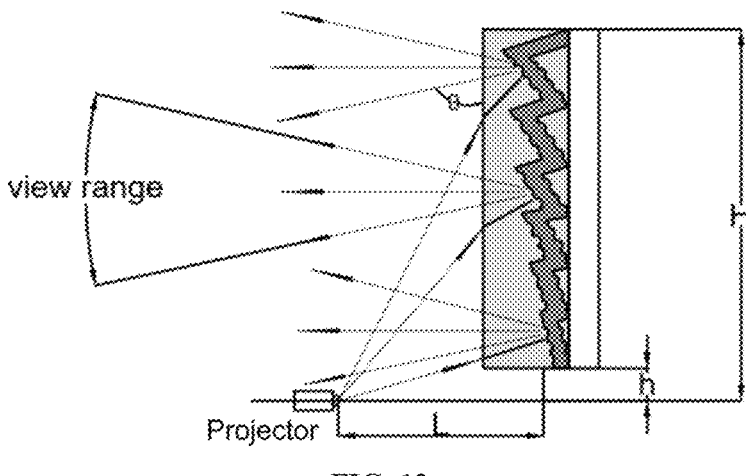
FIG. 12 shows a schematic diagram of projected light of a transparent projection screen with a Fresnel structure having a concave surface microstructure.

According to the present invention, as a preferred embodiment, it is also possible to provide convex or concave surface microstructures on the first side surface 23 of each of the Fresnel structural units. As shown in FIG. 10, the left panel of FIG. 10 shows the first side surface 23 having concave surface microstructures 26, and the right panel of FIG. 10 shows the first side surface 23 having convex surface microstructures 27. In the present embodiment, the concave surface microstructures 26 and convex surface microstructures 27 may be shaped, for example, in a spherical, ellipsoidal, or other regularly or irregularly arranged concave or convex shape, or a superimposed structure of multiple shapes, as will not be described further. The concave or convex surface structure design may change the direction of reflection of some of the projected light, further adjusting the visible range. FIG. 11 shows a schematic diagram of a sectional structure of a transparent projection screen with a Fresnel structure having a concave surface microstructure 26. FIG. 12 shows a schematic diagram of projected light of the transparent projection screen with a Fresnel structure having the concave surface microstructure 26. Preferably, a molding process of the convex or concave surface microstructure may for example be any one of collision point, transfer printing, sandblasting, and sputtering.

Figure 13:
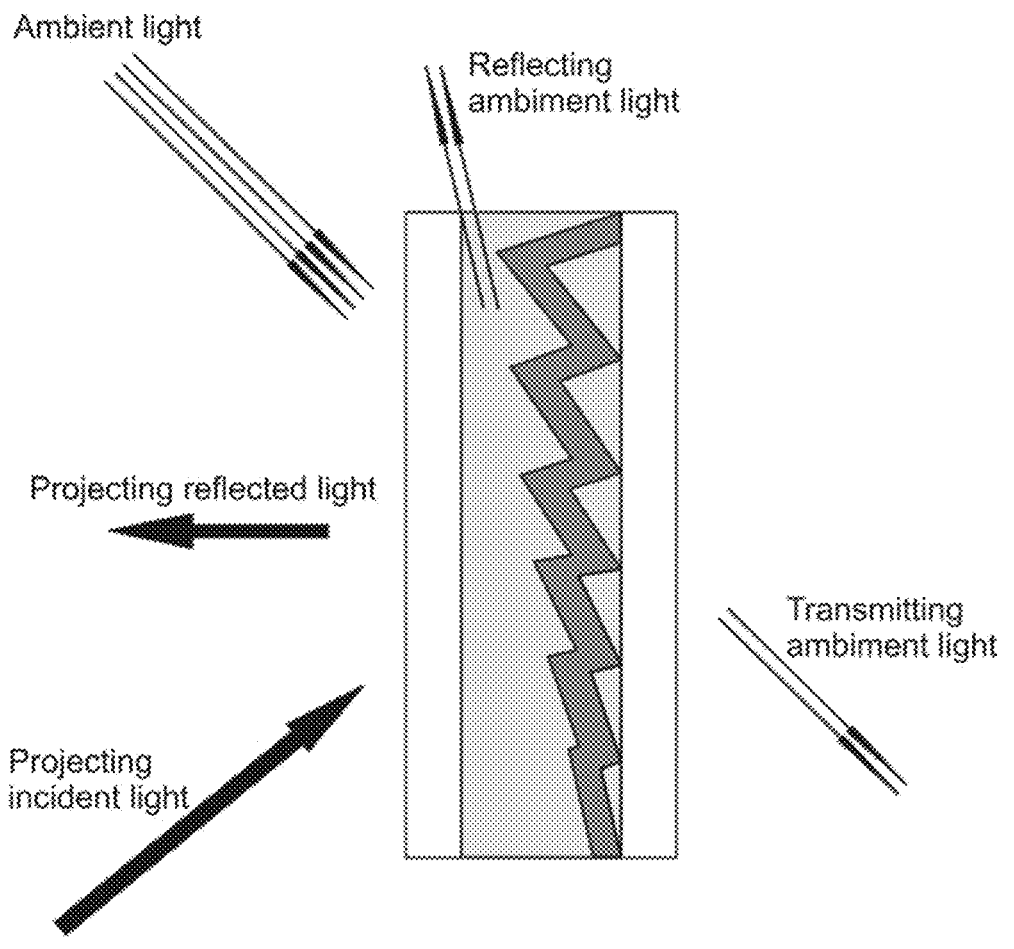
FIG. 13 shows the effect of the transparent projection screen according to the present application on the projected light of the projection side, and the ambient light.
Figure 14:
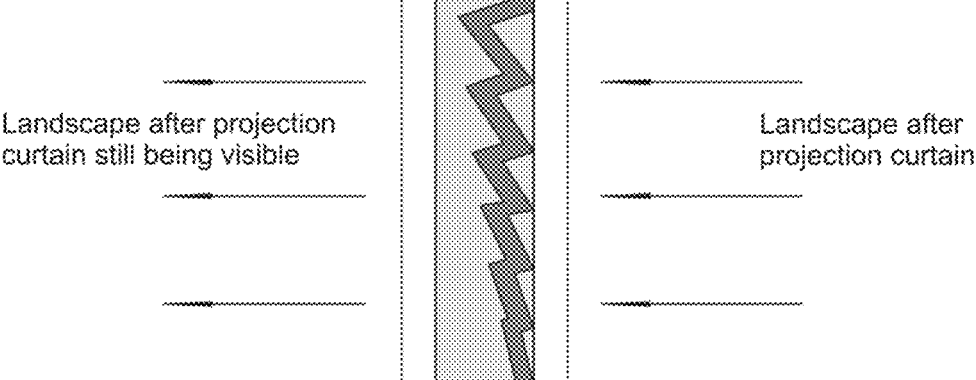
FIG. 14 shows the effect of the transparent projection screen according to the present application on ambient light on the non-projection side.

According to the present invention, the technical effect diagrams of the transparent projection screen with a Fresnel structure in the technical solution of the present application on projection light and ambient light are also shown. As shown in FIG. 13 and FIG. 14, in FIG. 13, ambient light that enters the projection screen from the upper part of the projection screen enters the environment again after reflecting and transmitting by the projection screen, so as to avoid the ambient light entering the visible range of the observer, and to ensure the display effect of the screen. In FIG. 14, light entering the projection screen from a non-projection side directly penetrates the projection screen into the observer's line of sight, thereby realizing the effect of transparent projection.

In order to prepare a transparent projection screen capable of resisting interference from ambient light and capable of high contrast clear imaging, the present application also provides a projection system. As shown in FIG. 6, FIG. 8, FIG. 9 and FIG. 12, the projection system comprises a projector and a transparent projection screen. The transparent projection screen is any one of the above-described transparent projection screens with a Fresnel structure. Preferably, the projector is a short throw projector or an ultra-short throw projector. Further preferably, the projector is disposed perpendicular to a plane where the transparent projection screen is located and in the same straight line as the common circle center.

In summary, the present application provides a transparent projection screen with a Fresnel structure. By providing a Fresnel structure unit with a specific structure, incident light irradiated onto each of the Fresnel structure units can be corrected by a Fresnel microstructure at that position and reflected to the direction of an observer in a certain visible range. In addition, since a projector is usually disposed on one side of the projection screen for projection, when reflecting light, the projection screen away from a plane where the projector is located is usually affected by external ambient light, resulting in that the picture brightness uniformity is inconsistent. Therefore, setting the angle $\beta1>60°$ is favorable for reflecting and transmitting the external ambient light into an area outside the visible range of the observer, thereby reducing the influence of the ambient light on the screen display picture and improving the contrast of the screen.

Although the description is described in accordance with the embodiments, not each embodiment contains only one independent technical solution, and this description is only for the sake of clarity. The person skilled in the art should take the description as a whole, and the technical solutions in the embodiments can be combined appropriately to form other embodiments that can be understood by the person skilled in the art.

The above listed series of detailed description is only for the feasible implementation of the present invention of the specific description, they are not used to limit the scope of protection of the present invention, where not out of the spirit of the art of the present invention to make the equivalent implementation or change of the invention should be comprised in the scope of protection of the present invention.

What is claimed is:

1. A projection system, comprising a projector and a transparent projection screen, the transparent projection screen comprising:

a substrate layer having a first surface and a second surface opposite to each other in parallel;

a Fresnel structural layer comprising a plurality of Fresnel structural units formed on the first surface of the substrate layer, wherein the plurality of Fresnel structural units is arranged to form a plurality of concentric arcs having a common circle center, each of the Fresnel structural units comprises a first side surface close to the common circle center, a second side surface away from the common circle center, and a bottom surface parallel to the first surface of the substrate layer, a plurality of the first side surfaces and a plurality of the second side surfaces form a first surface of the Fresnel structural layer, a plurality of the bottom surfaces form a second surface of the Fresnel structural layer, a cross-section of each of the Fresnel structural units comprises a line a, a line b, and a line c that mutually intersect, a tangent line at any point on the line b makes an angle $\beta1>60°$ with the line c, and the Fresnel structural layer has a first refractive index n1;

a display layer having a first surface and a second surface opposite to each other, wherein the second surface of the display layer is disposed on and substantially conformal to the first surface of the Fresnel structural layer, such that the display layer forms a structure substantially identical to the first surface of the Fresnel structural layer, and the display layer has a second refractive index n2; and a refractive index matching layer having a first surface and a second surface opposite to each other, wherein the second surface of the refractive index matching layer is disposed on and conformal to the first surface of the display layer, the first surface of the refractive index matching layer is a surface parallel to the second surface of the substrate layer, and the refractive index matching layer has a third refractive index n3, wherein the first refractive index n1 is substantially the same as the third refractive index n3, and wherein the projector is disposed perpendicular to a plane where the transparent projection screen is located and in the same straight line as the common circle center.

2. The projection system according to claim 1, wherein the projector is a short throw projector or an ultra-short throw projector.

3. The projection system according to claim 1, wherein a tangent line at any point on the line a makes an angle $\alpha 1$, $0° < \alpha 1 \leq 60°$, to the line c.

4. The projection system according to claim 3, wherein a vertical distance from a point of intersection P of the line a with the line b to the line c is h1, and h1 on each of the Fresnel structure units increases gradually as it is further away from the common circle center.

5. The projection system according to claim 3, wherein each of the Fresnel structure units has a triangular cross-section, an angle between the line a and the line c is $\alpha 2$, $0° < \alpha 2 \leq 60°$, and an angle between the line b and the line c is $\beta 2$, $\beta 2 > 60°$.

6. The projection system according to claim 5, wherein the angle $\alpha 2$ on different Fresnel structure units increases gradually as it is further away from the common circle center.

7. The projection system according to claim 6, comprising a first side plane immediately close to the common circle center and a second side plane away from the common circle center and opposite to the first side plane, wherein the Fresnel structure unit moves in a straight line in a direction perpendicular to a plane where the first side plane is located from the first side plane to the second side plane, and the angle $\alpha 2$ of the Fresnel structural unit shows an overall monotonically increasing trend.

8. The projection system according to claim 6, wherein the line c on each of the Fresnel structure units has a substantially fixed length.

9. The projection system according to claim 6, wherein the vertical distance from the point of intersection P of the line a with the line b to the line c on each of the Fresnel structure units is h1, and h1 has a substantially fixed height.

10. The projection system according to claim 1, wherein the first refractive index n1 ranges from 1.4 to 1.6.

11. The projection system according to claim 10, wherein a first transparent optical material for preparing the Fresnel structure layer is an optical grade high transmittance optical adhesive, the optical grade high transmittance optical adhesive being at least one of an acrylic type resin, an unsaturated polyester, a polyurethane, an epoxy resin, and a light curing adhesive.

12. The projection system according to claim 1, wherein the display layer has a thickness d≤500 μm.

13. The projection system according to claim 12, wherein a molding process of the display layer is any one of evaporation, sputtering, coating, and sandblasting.

14. The projection system according to claim 1, wherein the second refractive index n2 is ≥1.6.

15. The projection system according to claim 14, wherein a second transparent optical material for preparing the display layer is metal or metal oxide.

16. The projection system according to claim 1, wherein a material for preparing the substrate layer is a rigid transparent material or a flexible transparent material.

17. The projection system according to claim 1, wherein the first side surface of each of the Fresnel structure units is provided with a convex or concave surface microstructure.

18. The projection system according to claim 1, further comprising a protective layer disposed on the first surface of the refractive index matching layer.

* * * * *